United States Patent
Piret

(10) Patent No.: US 6,510,181 B1
(45) Date of Patent: Jan. 21, 2003

(54) METHOD AND DEVICE FOR TRANSMITTING INFORMATION, METHOD AND DEVICE FOR RECEIVING INFORMATION

(75) Inventor: Philippe Piret, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/298,828

(22) Filed: Apr. 26, 1999

(30) Foreign Application Priority Data

Apr. 28, 1998 (FR) .......................................... 98 05304

(51) Int. Cl.[7] .............................................. H04K 27/00
(52) U.S. Cl. ..................... 375/259; 375/295; 375/316
(58) Field of Search ................... 375/259, 260, 375/295, 316, 377, 219; 708/201; 370/208

(56) References Cited

U.S. PATENT DOCUMENTS 4,797,902 A * 1/1989 Nishiguchi et al.

FOREIGN PATENT DOCUMENTS

WO    WO96/36144    11/1996

OTHER PUBLICATIONS

J.A.F. Ross et al., "Vector Assignment Scheme For M+N Users in N–Dimensional Global Additive Channel," Electronics Letters, vol. 28, No. 17, Aug. 13, 1992, pp. 1634–1636.

R.G. Kiwimagi, "Multilevel Signal Transfers," IBM Technical Disclosure Bulletin, vol. 21, No. 5, Oct. 1978, pp. 1798–1800.

Hideichi Sasaoka et al., "Time Spread Modulation System For Digital Land Mobile Radio Communication," Electronics & Communications in Japan, Part I–Communications, vol. 76, No. 5, May 1, 1993, pp. 54–65.

* cited by examiner

Primary Examiner—Jean Corrielus
(74) Attorney, Agent, or Firm—Fitzpatrick, Cella, Harper & Scinto

(57) ABSTRACT

A method of sending information includes sending, on a transmission channel, sequences of symbols. The sequences are of a fixed length that is not a multiple of 4 and are taken from a collection of sequences, at least three of which are orthogonal in pairs and such that any pair of sequences that is not orthogonal to each other comprises opposite sequences. The symbols are taken from an alphabet of non-nil integers.

34 Claims, 4 Drawing Sheets

METHOD AND DEVICE FOR TRANSMITTING INFORMATION, METHOD AND DEVICE FOR RECEIVING INFORMATION

BACKGROUND OF THE INVENTION

The present invention relates to a device and method for sending symbols and to a device and method for receiving symbols.

It deals more precisely with the technique of direct sequence spread spectrum, or "DSSS". This method is a data transmission method in which the band width used is wider than that which is required by the flow of information. In place of the transmission of an information symbol every T seconds (situation "1"), here a symbol is transmitted every T/n seconds with the additional constraint that, the set of n symbols transmitted between times i. T and (i+1). T (i being integer), the first transmitted symbols greatly reduce the possible values of the last symbols transmitted (situation "2").

The sequence of n "short" symbols which replaces a single "long" symbol is referred to as the spread sequence.

After modulation (amplitude, phase, quadrature amplitude etc) of a carrier, the resulting power spectrum is different between situations 1 and 2:

typically, in situation 1, the power spectrum is narrow but has a high value in this narrow range. Conversely, in situation 2, the power spectrum is wider (by a factor of approximately n) and it has a low value over this wide range. An advantage of situation 2 compared with situation 1 is that it makes the transmission more resistant to frequency-dependent noise and fading due to the multiple propagation paths of the translated signals. In fact situation 2 better distributes the transmission power as a function of spread spectrum is made compulsory by many current regulations.

When a spread sequence is received after transmission over a channel, the receiver will have to estimate the corresponding information. It is known that this task is easier and can be carried out more effectively when the transmitted sequences are chosen from a set of sequences obtained from a set of sequences which are orthogonal in pairs, by multiplying each of these sequences on the one hand by "+1" and on the other hand by "−1" (this second product supplying a sequence which is said to be the "opposite" of the multiplied sequence).

Considering, for example, a channel accepting at its input signals which are amplitude modulated proportionally to any one of the numbers of the alphabet A={−7, −5, −3, −1, 1, 3, 5, 7}. This is then referred to as an 8-AM modulation. It will in this case be wished to construct a set of sequences $x=(x_1, \ldots, x_n)$ of length n on the alphabet A and to represent the information to be transmitted by a succession of such sequences x. As indicated above, each sequence x of n short symbols $x_i$ can be used to replace a single long symbol. To achieve the same flow of information in replacing each of the eight "long" symbols of A by a different sequence of length n on A, whilst making use of certain properties of orthogonality between different sequences, it suffices for example to be capable of constructing four different sequences of length n on the alphabet A. If $v_1$, $v_2$, $v_3$ and $v_4$ are these four sequences and if the four sequences $v_5=-v_1$, $v_6=-v_2$, $v_7=-v_3$ and $v_8=-v_4$ are added to all these four sequences, there are in fact eight sequences of length n on A. If $v_i$ and $v_j$ are two different sequences amongst these eight sequences and if they are not orthogonal to each other, then they satisfy $v_i=-v_j$. These properties are important since they permit a simple estimation of the transmitted sequence, by correlating the received sequence with each of the four sequences $v_1$, $v_2$, $v_3$ and $v_4$.

This number of four sequences which are orthogonal in pairs is therefore sufficient in the example under consideration. However, when four such sequences which are orthogonal in pairs can be constructed, of length n greater than 4, it is sometimes possible to construct more of them and even to construct the maximum number of them, namely n. This is not without interest since the additional available sequences make it possible to increase the transmitted information rate. If in fact k such sequences are available, where k is an integer verifying $4<k\leq n$, it is in fact well known that this makes it possible to multiply the channel transmission rate, measured in bits per second, by a factor $((\log_2(2k))/3$, compared with the case where only the 8 signals of the alphabet A are used without spread during each interval of T seconds.

The construction of n sequences which are orthogonal in pairs, of length n on the alphabet A, amounts to constructing a matrix H of type n×n on A, such that all the elements of the principal diagonal of the matrix equal to the matrix product of H and its transposition $H^T$ are non-nil and all the elements outside this principal diagonal are nil.

The case where all the non-nil values of $H.H^T$ are equal (that is to say $H.H^T=M.I_n$ where $I_n$ is the identity matrix n×n) is particularly interesting since it corresponds to the case where the energy of the signal which is amplitude modulated by the sequence associated with each line of H, is identical. The matrix H is then said to be "balanced".

Such matrices H on the alphabet A such that $H.H^T=M.I_n$ have actually been constructed by the inventor but only for values of n which are multiples of 4. However, it is clear that, in some applications, more general values of n are necessary. In particular the case where n=10 is very interesting because it corresponds to the minimum spread factor required by certain regulations. However, in the case n=10, it can be demonstrated that there is no matrix with 10 rows and 10 columns on the alphabet A which satisfies $H.H^T=M.I_{10}$, with M>0.

SUMMARY OF THE INVENTION

The present invention relates, according to a first aspect, to a method of transmitting on a transmission channel, characterised in that it includes an operation of sending, on the said channel, sequences of a fixed length which is not a multiple of 4, symbols taken from an alphabet of non-nil integers, the said sequences being taken from a collection of sequences in which at least three are orthogonal in pairs and such that any pair of sequences which are not orthogonal to each other consist of opposite sequences.

It should be stated here that two sequences are said to be "opposite" when their homologous terms (that is to say with the same ranking in the two sequences) are opposite.

By virtue of these provisions, the sequences of transmitted symbols benefit, on reception, from the effects of their orthogonality or opposition, whereas, prior to the present invention, no orthogonal matrix was known with the characteristics of having dimensions which are not multiples of 4 on the one hand and having been constructed on an alphabet of non-nil integers on the other hand.

Thus the idea at the basis of the invention is, in the example mentioned above, using the alphabet A*={−4, −3, −2, −1, +1, +2, +3, +4} in place of the alphabet A.

As the elements of the alphabets (A,A*, . . . ) define the physical quantities transmitted on the channel only to within a factor of proportionality, it will be noted that two alphabets are equivalent if one of them can be derived from the other by multiplying all its elements by a fixed quantity. Thus the alphabet A* is equivalent to the alphabet B*={−8, −6, −4, −2, +2, +4, +6, +8}, which is obtained by multiplying each of the symbols of the alphabet A* by two. The alphabet B* is also obtained by adding the value 1 to the absolute value of each of the symbols of the alphabet A.

The invention uses this alphabet A* for the transmission of information.

According to particular characteristics, the said collection includes a number of sequences which are orthogonal in pairs, equal to the length of the said sequences.

It will in fact be demonstrated below that the alphabet A* makes it possible to produce matrices with 10 rows and 10 columns satisfying:

$$H.H^T = M\, I_{10} \qquad (1)$$

By virtue of these provisions, the number of sequences of the collection which are orthogonal in pairs is at a maximum, which makes it possible to take greatest advantage of the constraint of orthogonality or opposition of the sequences in order to transmit a maximum quantity of information on the said channel.

According to particular characteristics, the said alphabet includes all the non-nil integers whose absolute value is less than a predetermined value.

By virtue of these provisions, the alphabet used is particularly simple and the components used for sending modulated sequences of symbols of this alphabet are also particularly simple to use.

According to particular characteristics, a matrix formed by the said orthogonal sequences can be broken down into circulant square sub-matrices.

By virtue of these provisions, the said matrix is determined by determining, in an intermediate step, of such sub-matrices, which is more simple since on the one hand the dimensions of the sub-matrices are necessarily less than those of the matrix, and on the other hand the circulant sub-matrices are specified by the elements of their first row, these two considerations considerably reducing the number of matrices to be considered.

According to a second aspect, the present invention relates to a method of receiving on a transmission channel, characterised in that it includes:

an operation of receiving, on the said channel, sequences with a fixed length which is not a multiple of 4, and an operation of estimating the said sequences in sequences of symbols taken from an alphabet of non-nil integers, the said sequences being taken from a collection of sequences, at least three of which are orthogonal in pairs and such that any pair of sequences which are not orthogonal to each other consists of opposite sequences.

According to a third aspect, the present. invention relates to a method of transmitting on a transmission channel, characterised in that it includes an operation of sending, on the said channel, numbers which are multiples of all the non-nil integers whose absolute value is less than a predetermined value.

According to a fourth aspect, the present invention relates to a device for transmitting on a transmission channel, characterised in that it has:

a processing means adapted to associate, with information to be transmitted, at least one sequence with a fixed length which is not a multiple of 4, of symbols taken from an alphabet of non-nil integers, the said sequences being taken from a collection of sequences, at least three of which are orthogonal in pairs and such that any pair of sequences which are not orthogonal to each other consist of opposite sequences, and a sending means adapted to send, on the said channel, each of the said sequences.

According to a fifth aspect, the present invention relates to a device for receiving on a transmission channel, characterised in that it includes:

a means of receiving, on the said channel, sequences with a fixed length which is not a multiple of 4, and a means of estimating the said sequences in sequences of symbols taken from an alphabet of non-nil integers, the said sequences being taken from a collection of sequences, at least three of which are orthogonal in pairs and such that any pair of sequences which are not orthogonal to each other consists of opposite sequences.

According to a sixth aspect, the present invention relates to a device for transmitting on a transmission channel, characterised in that it has a means of sending on the said channel adapted to send solely numbers which are multiples of all the non-nil integers whose absolute value is less than a predetermined value.

The invention also relates to a camera, a facsimile machine, a photographic apparatus, a computer, characterised in that they have a device as briefly disclosed above.

The invention also relates to:

a means of storing information which can be read by a computer or microprocessor storing instructions of a computer program, characterised in that it permits the implementation of the method of the invention as briefly disclosed above, a means of storing information which can be read by a computer or microprocessor storing data resulting from the implementation of the method as briefly disclosed above, a means of storing information which can be removed, partially or totally, and which can be read by a computer or microprocessor storing instructions of a computer program characterised in that it permits the implementation of the method of the invention as briefly disclosed above, and a means of storing information which can be removed, partially or totally, and which can be read by a computer or microprocessor storing data resulting from the implementation of the method as briefly disclosed above.

The preferential or particular characteristics and the advantages of the transmission devices and methods, of the receiving device and method, of this camera, of this facsimile machine, of this photographic apparatus, of this computer and of these information storage means being identical to those of the transmission method, these advantages are not repeated here.

BRIEF DESCRIPTION OF THE DRAWINGS

The invention will be understood more clearly from a reading of the following description, given with regard to the accompanying drawings in which.

In the remainder of the description, the terms "coding device" and "transmission device" are used indifferently to identify the device which sends signals over the transmission channel used. In the same way, the terms "decoding device" and "receiving device" are used indifferently for identifying the device which receives the signals on the transmission channel used.

DETAILED DESCRIPTION OF THE INVENTION

In the preferential embodiment described and depicted, a balanced orthogonal matrix is considered, that is to say a matrix on an alphabet integers which satisfies $H.H^T = M.I_n$, with $H^T$ the transposed matrix of H, $I_n$ the identity matrix of dimensions n×n, and M a strictly positive integer.

In addition, the alphabet of numbers on which the matrix H, is constructed is chosen as being the alphabet A*.

However, the invention applies just as well to non-balanced orthogonal matrices.

Figure 1:
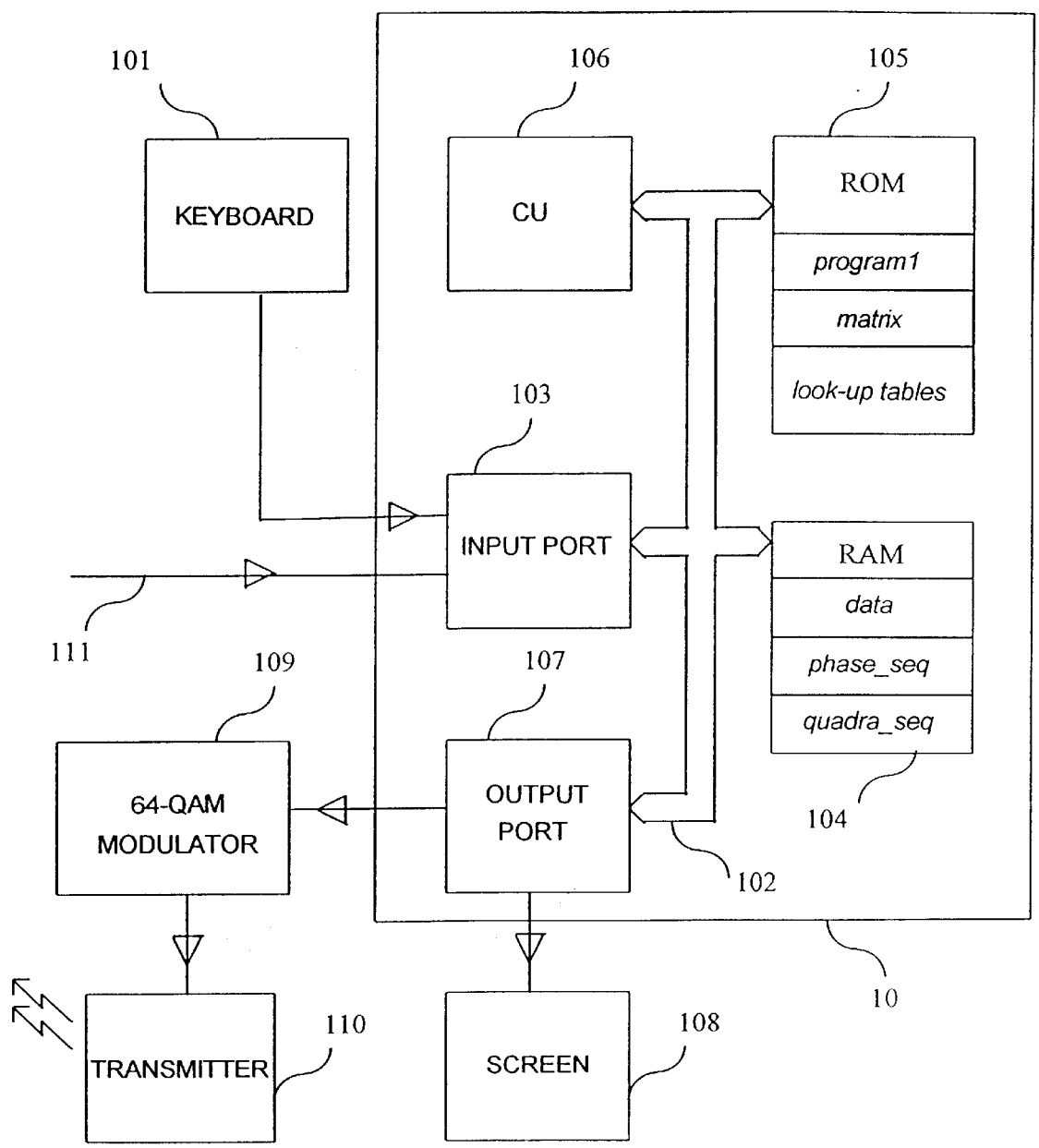
FIG. 1 depicts a coding device according to the present invention.

Before commencing the description of the coding device illustrated in FIG. 1, it is essential to disclose the theoretical bases which enable the required matrices to be formed.

DETERMINING A 10×10 ORTHOGONAL MATRIX ON THE ALPHABET A*

The idea at the basis of the determination of the orthogonal matrix used by the devices described in FIGS. 1 to 4 consists of breaking down this matrix into circulant submatrices and then resolving the system of matrix equations which results from this choice.

Let $q=(q_0, q_1, q_2, q_3, q_4)$, let r, s and u be 5-tuples on A* and let Q, R, S and U be the circulant matrices of dimensions 5×5 based on q, r, s and u, respectively. For example, with $r=(r_0, r_1, r_2, r_3, r_4)$, R is given by $$R = \begin{vmatrix} r_0 & r_1 & r_2 & r_3 & r_4 \\ r_4 & r_0 & r_1 & r_2 & r_3 \\ r_3 & r_4 & r_0 & r_1 & r_2 \\ r_2 & r_3 & r_4 & r_0 & r_1 \\ r_1 & r_2 & r_3 & r_4 & r_0 \end{vmatrix}$$

With each choice of q, r, s and u on A*, there is then associated the 10×10 matrix:

$$H = \begin{vmatrix} Q & R \\ S & U \end{vmatrix} \quad (2)$$

and the problem is to enumerate the choices which make the matrix H orthogonal.

There is here:

$$H \cdot H^T = \begin{vmatrix} Q \cdot Q^T + R \cdot R^T & Q \cdot S^T + R \cdot U^T \\ S \cdot Q^T + U \cdot R^T & S \cdot S^T + U \cdot U^T \end{vmatrix} \quad (3)$$

which shows that the following equations must then be complied with:

$Q.Q^T + R.R^T = M\ I_5$ $S.S^T + U.U^T = M\ I_5$ $Q.S^T + R.U^T = O_5 \quad (4)$ $O_5$ being the null matrix of type 5×5.

The enumeration algorithm has two steps. First of all, for certain values of M (M=65 for example), the list V of all the pairs (q,r) of 5-tuples on A* can be drawn up such that the corresponding matrices Q and R satisfy the first equation of the system of equations (4).

Next, let there be two pairs (q,r) and (s,t) of 5-tuples which respectively satisfy the first and second equation of the equation system (4). The only residual constraint is to verify that the corresponding matrices Q, R, S and U satisfy the third equation of the equation system (4).

The list has been established of all the pairs (q,r) of 5-tuples on A* which satisfy $q_0=4$ or $r_0=4$ and $Q.Q^T + R.R^T = 65\ I_5$.

This list V contains 320 pairs (q,r) and some of these pairs are given by:

| q | r |
|---|---|
| (4, −4, −2, −1, −1) | (1, −2, 3, 3, 2) |
| (4, −4, −1, −1, 1) | (2, −3, −2, −3, −2) |
| (3, 3, −2, 1, 2) | (4, −1, −1, −2, −4) |
| (3, 3, 2, 1, −2) | (4, 2, 1, 1, −4) |

By choosing two pairs (q,r) and (s,u) in V, and seeking whether the third equation of (4) is satisfied for the associated matrices Q, R, S and U, 48 4-tuples (q, r, s, u) are found.

Two of these 4-tuples are now given here:

q (4, −1, −4, −1, −2) (4, 1, −1, −1, −4)

r (3, 1, 3, −2, 2) (3, 2, −2, 3, 2)

s (3, 1, 3, 2, −2) (2, 3, −2, 2, 3)

u (4, 1, −4, 2, 1) (4, 1, 1, −1, −4)

and the matrix $H_{10}$ of type 10×10 associated with a second of these 4-tuples is:

$$H_{10} = \begin{vmatrix} 4 & 1 & -1 & -1 & -4 & 3 & 2 & -2 & 3 & 2 \\ -4 & 4 & 1 & -1 & -1 & 2 & 3 & 2 & -2 & 3 \\ -1 & -4 & 4 & 1 & -1 & 3 & 2 & 3 & 2 & -2 \\ -1 & -1 & -4 & 4 & 1 & -2 & 3 & 3 & 3 & 2 \\ 1 & -1 & -1 & -4 & 4 & 2 & -2 & 3 & 2 & 3 \\ 2 & 3 & -2 & 2 & 3 & 4 & 1 & 1 & -1 & -4 \\ 3 & 2 & 3 & -2 & 2 & -4 & 4 & 1 & 1 & -1 \\ 2 & 3 & 2 & 3 & -2 & -1 & -4 & 4 & 1 & 1 \\ -2 & 2 & 3 & 2 & 3 & 1 & -1 & -4 & 4 & 1 \\ 3 & -2 & 2 & 3 & 2 & 1 & 1 & -1 & 4 & 4 \end{vmatrix} \quad (5)$$

A similar method can be used for attempting to obtain an orthogonal n×n on the same alphabet where n is a number which is not a multiple of 4 and, more particularly an even number which is not a multiple of 4. In way there is for example obtained:

For $n = 6$: (6)

$$H_6 = \begin{vmatrix} 1 & -2 & -3 & 1 & -1 & 4 \\ -3 & 1 & -2 & 4 & 1 & -1 \\ -2 & -3 & 1 & -1 & 4 & 4 \\ 4 & -1 & 1 & 3 & 2 & -1 \\ 1 & 4 & -1 & -1 & 3 & 2 \\ -1 & 1 & 4 & 2 & -1 & 3 \end{vmatrix}$$

which satisfies $H_6 \cdot H_6^T = 32 \cdot I_6$.

Likewise, for $n = 14$:

$$H_{14} = \begin{vmatrix} 4 & -3 & -2 & 1 & -1 & -1 & -2 & 4 & 1 & 2 & -3 & -1 & 3 & 2 \\ -2 & 4 & -3 & -2 & 1 & -1 & -1 & 2 & 4 & 1 & 2 & -3 & -1 & 3 \\ -1 & -2 & 4 & -3 & -2 & 1 & -1 & 3 & 2 & 4 & 1 & 2 & -3 & -1 \\ -1 & -1 & -2 & 4 & -3 & -2 & 1 & -1 & 3 & 2 & 4 & 1 & 2 & -3 \\ 1 & -1 & -1 & -2 & 4 & -3 & -2 & -3 & -1 & 3 & 2 & 4 & 1 & 2 \\ -2 & 1 & -1 & -1 & -2 & 4 & -3 & 2 & -3 & -1 & 3 & 2 & 4 & 1 \\ -3 & -2 & 1 & -1 & -1 & -2 & 4 & 1 & 2 & -3 & -1 & 3 & 2 & 4 \\ 4 & 3 & 2 & -1 & 1 & -3 & 2 & 4 & -1 & -2 & 3 & 1 & 1 & -2 \\ 2 & 4 & 3 & 2 & -1 & 1 & -3 & -2 & 4 & -1 & -2 & 3 & 1 & 1 \\ -3 & 2 & 4 & 3 & 2 & -1 & 1 & 1 & -2 & 4 & -1 & -2 & 3 & 1 \\ 1 & -3 & 2 & 4 & 3 & 2 & -1 & 1 & 1 & -2 & 4 & -1 & -2 & 3 \\ -1 & 1 & -3 & 2 & 4 & 3 & 2 & 3 & 1 & 1 & -2 & 4 & -1 & -2 \\ 2 & -1 & 1 & -3 & 2 & 4 & 3 & -2 & 3 & 1 & 1 & -2 & 4 & -1 \\ 3 & 2 & -1 & 1 & -3 & 2 & 4 & -1 & -2 & 3 & 1 & 1 & -2 & 4 \end{vmatrix}$$

satisfies $H_{14}.H_{14}^T = 80.I_{14}$. Moreover, it is worth mentioning that any matrix obtained from the matrices constructed above, such as $H_6$, $H_{10}$ and $H_{14}$, by permutation of their rows or columns or by multiplication of some of their rows or columns by a factor $-1$, is also an orthogonal matrix on the same alphabet.

DESCRIPTION OF A PARTICULAR EMBODIMENT OF THE INVENTION

In FIG. 1, the coding device is illustrated in the form of a block diagram and depicted under the general reference 10, and has, connected together by an address and data bus 102:

- a central processing unit 106;
- a random access memory RAM 104;
- a read only memory ROM 105;
- an input port 103 serving to receive, in the form of binary data, information which the coding device is to transmit;
- an output port 107 receiving successively two sequences on the alphabet A* and transmitting simultaneously the pairs formed by their homologous elements to a modulator 109 which, from this sequence of pairs, produces a sequence of symbols of the alphabet of the transmission channel, consisting here of a 64-state alphabet known as "64-QAM" modified in that the in-phase and quadrature amplitudes are no longer proportional to the elements of the alphabet A but are proportional to the elements of A*; and, independently of the bus 102:
- a sender 110 having a UHF interface circuit which transposes the signal modulated by the modulator 109 to a carrier frequency and amplifies it, and a transmitting antenna which broadcasts this transposed and amplified signals;
- a display screen 108 connected to the output port 107;
- a keyboard 101 connected to the input port 103 and supplying octets representing the keyboard keys used in succession; and
- an input 111 for data to be transmitted, in the form of binary data, connected to the input port 103.

Each of the elements illustrated in FIG. 1 is well known to persons skilled in the art of transmission systems and, more generally, information processing systems. These elements are therefore not described here.

It should be noted here that the word "register" used below designates, in each of the memories, both a memory area of low capacity (storing only a few binary data) and a memory area of large capacity (enabling an entire program to be stored).

The random access memory 104 stores data, variables and intermediate processing results, in memory registers bearing, in the remainder of the description, the same names as the data whose values they store. The random access memory 104 contains notably:

- a register "data" in which there is stored a series of binary data to be transmitted which comes from the input port 103,
- a register "phase_seq" in which there is stored the sequence of symbols of the alphabet of the transmission channel which corresponds to the in-phase components, and
- a register "quadra_seq" in which there is stored the sequence of symbols of the alphabet of the transmission channel which corresponds to the phase quadrature components.

The random access memory 104 constitutes a means of storing information which can be read by a computer or microprocessor. It stores data resulting from the implementation of this method, that is to say coded data.

According to a variant, the random access memory 104 is removable, partially or totally, and has for example a magnetic tape or a diskette.

The read only memory 105 stores data in memory registers bearing, in the remainder of the description, the same names as the data whose values they store. The read only memory 105 contains notably:

the operating program or the central processing unit 106, in a register "program1", the orthogonal matrix $H_{10}$ in a register "matrix", a so-called "row" look-up table matching three binary symbols received by means of the data input 111 with a row of the orthogonal matrix $H_{10}$.

In the example described and depicted, the matrix $H_{10}$ is a 10×10 matrix determined as disclosed above:

$$H_{10} = \begin{vmatrix} 4 & 1 & -1 & -1 & -4 & 3 & 2 & -2 & 3 & 2 \\ -4 & 4 & 1 & -1 & -1 & 2 & 3 & 2 & -2 & 3 \\ -1 & -4 & 4 & 1 & -1 & 3 & 2 & 3 & 2 & -2 \\ -1 & -1 & -4 & 4 & 1 & -2 & 3 & 3 & 3 & 2 \\ 1 & -1 & -1 & -4 & 4 & 2 & -2 & 3 & 2 & 3 \\ 2 & 3 & -2 & 2 & 3 & 4 & 1 & 1 & -1 & -4 \\ 3 & 2 & 3 & -2 & 2 & -4 & 4 & 1 & 1 & -1 \\ 2 & 3 & 2 & 3 & -2 & -1 & -4 & 4 & 1 & 1 \\ -2 & 2 & 3 & 2 & 3 & 1 & -1 & -4 & 4 & 1 \\ 3 & -2 & 2 & 3 & 2 & 1 & 1 & -1 & 4 & 4 \end{vmatrix} \quad (5)$$

The read only memory 105 constitutes a means of storing information which can be read by a computer or microprocessor. It stores instructions of a computer program which implements the coding method which is the object of the invention.

According to a variant, the read only memory 105 is removable, partially or totally, and has for example a magnetic tape, a diskette or a fixed-memory compact disc ("CD-ROM").

As an example of a row look-up table, the following table matches a triplet of binary numbers with a row index of the matrix $H_{10}$:

000 row 1
001 row 2
010 row 3
011 row 4
100 row 5
101 row 6
110 row 7
111 row 8

Figure 2:
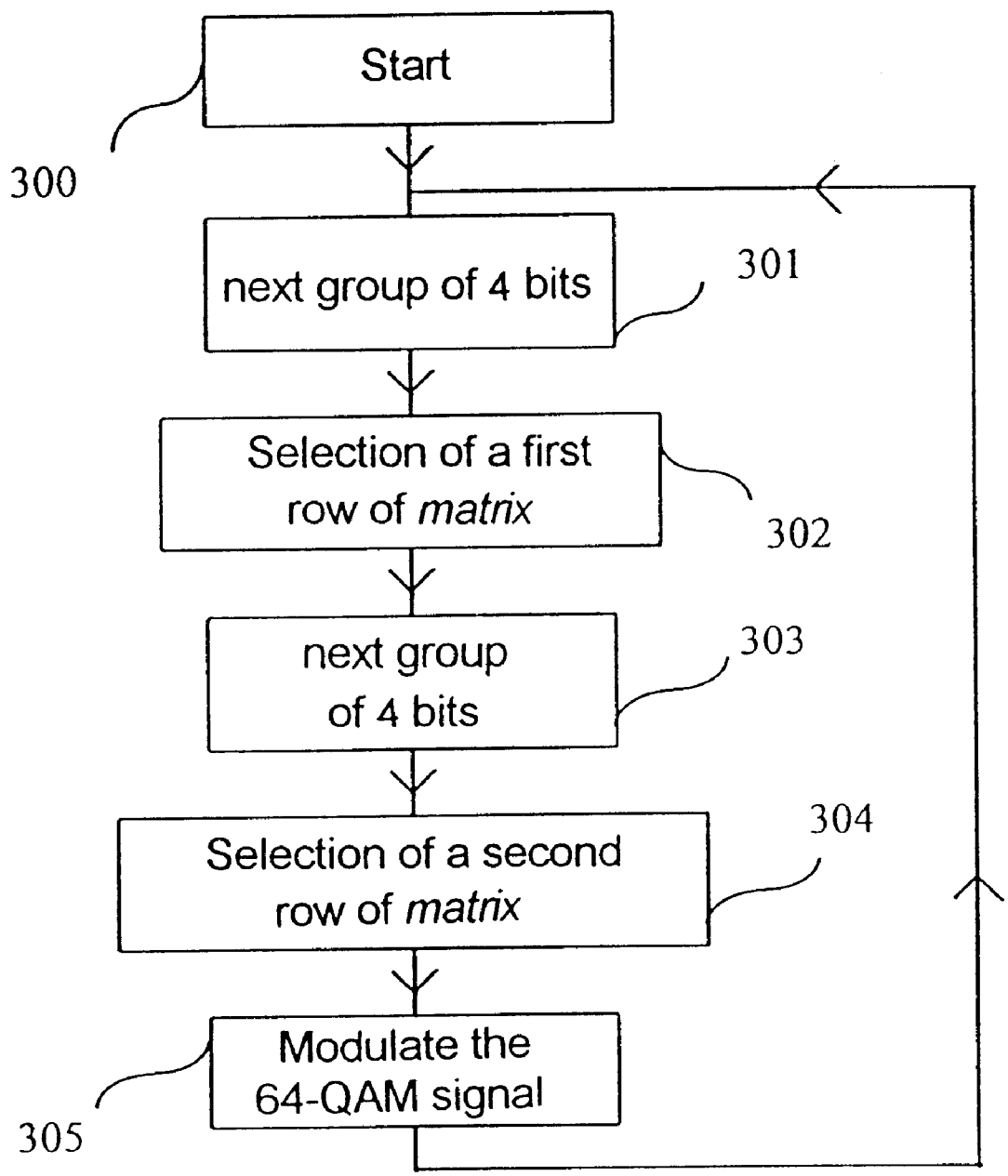
FIG. 2 depicts an operating flow diagram of the coding device illustrated in FIG. 1.

The central processing unit 106 is adapted to implement the flow diagram described in FIG. 2. In this FIG. 2, it will be observed that, during an operation 300, the initialisation of the transmission device illustrated in FIG. 1 is effected.

Next, during an operation 301, from amongst the binary symbols to be transmitted, which are available at the input port 103, the central unit 106 takes a group formed by the first four binary symbols to be transmitted, and puts them in the register "data" of the random access memory 104.

During an operation 302, the central unit 106 uses the row look-up table, stored in the read only memory 105, in order to select a row representing the first three binary symbols to be transmitted placed in the register "data".

During the operation 302, the central unit 106 associates with the fourth binary data item to be transmitted a multiplying coefficient +1 or −1, associating for example the coefficient "+1" with the binary data item "1" and the coefficient "−1", with the binary data item "0", effects the product of this coefficient and the sequence selected during the operation 302 and puts the sequence thus determined in the register "phase_seq".

Then, during an operation 303, from amongst the binary symbols to be transmitted, which are available at the input port 103, the central unit 106 takes a new group formed by the first four binary symbols to be transmitted, and puts it in the register "data" of the random access memory 104.

During an operation 304, the central unit 106 uses the row look-up table stored in the read only memory 105 to select a row representing the first three binary symbols to be transmitted placed in the register "data".

During an operation 304, the central unit 106 associates a multiplying coefficient +1 or −1 with the fourth binary data item to be transmitted, as disclosed for operation 302, and puts the sequence thus determined in the register "quadra_seq".

Finally, during an operation 305, the central unit 106 transmits to the modulator 109, by means of the output port 107, successively each pair formed by one of the elements of the sequence stored in the register "phase_seq" and one of the elements of the sequence stored in the register "quadra_seq", following their order in these sequences. There are thus ten pairs transmitted which represent eight information bits to be transmitted. Then operation 301 is reiterated.

A description will now be given of the decoding effected in accordance with the invention, particularly adapted here to a channel close to a theoretical additive white gaussian noise channel, better known by the initials AWGN.

Figure 3:
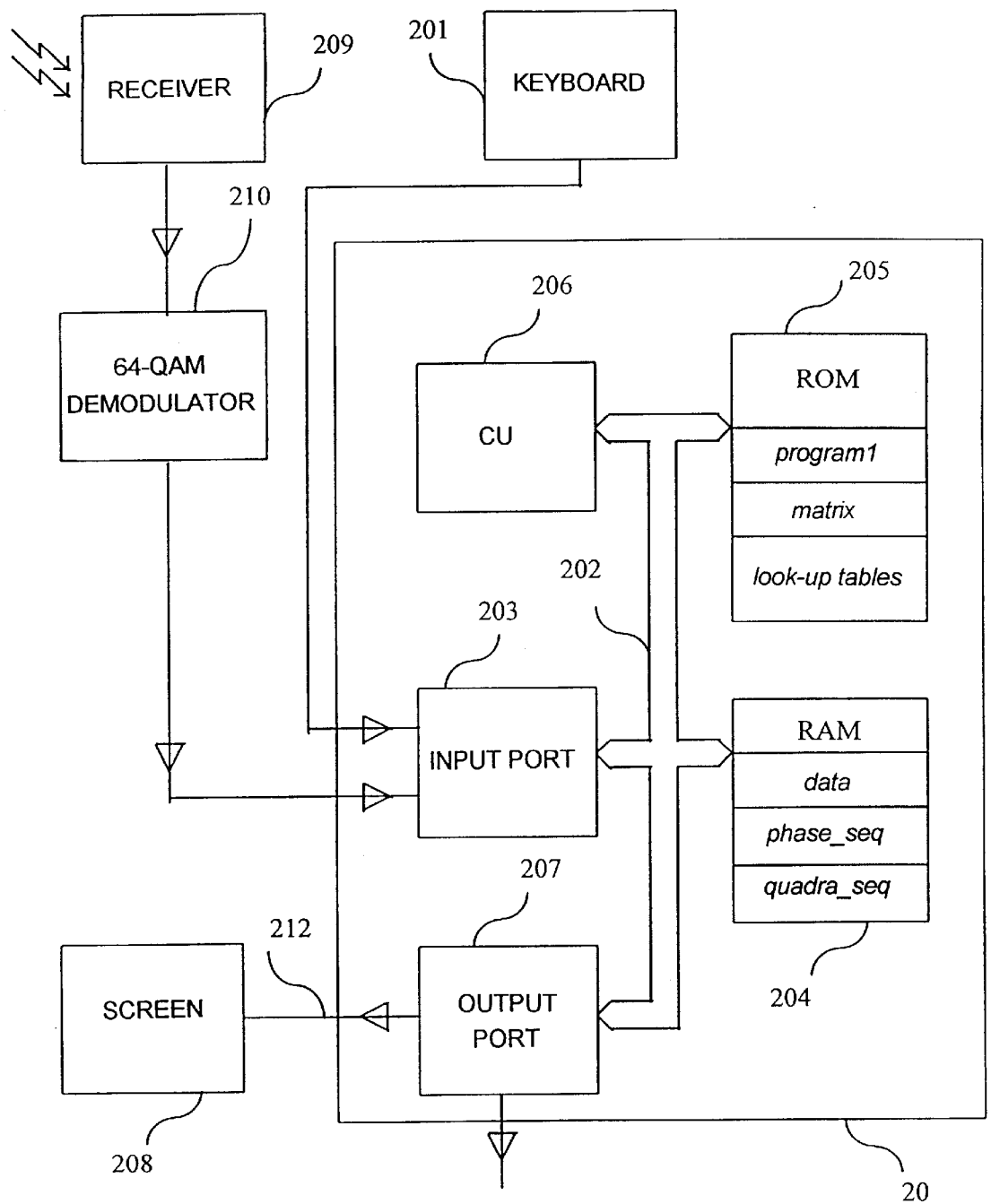
FIG. 3 depicts a decoding device according to the present invention.

The decoding device depicted in FIG. 3, under the general reference 20, is illustrated in the form of a block diagram. It has, connected together by an address and data bus 202:

a central processing unit 206;
a random access memory RAM 204;
a read only memory ROM 205;
an input port 203 serving to receive information which the decoding device is to process, store or transmit;
an output port 207 for transmitting, to the decoding device, sequences of decoded binary information symbols; and, independently of the bus 202:
a receiver 209 having a receiving antenna which receives a signal representing the signal sent by the transmitting antenna 110 of a coding device, and a UHF interface circuit which effects an automatic gain control and a transposition into a base band of the signal received;
a demodulator 210, connected to the input port 203, effecting a demodulation, in the form of two sequences of symbols representing sequences of symbols received by the antenna 209 and previously modulated by modified 64-state quadrature amplitude modulation, by the device illustrated in FIG. 1;
a display screen 208 connected to the output port 207; and
a keyboard 201 connected to the input port 203.

It should be noted here that the demodulator 210 can supply either sequences of symbols of the alphabet A*={−4, −3, −2, −1, 1, 2, 3, 4}, in the case of so-called "hard" decoding, or sequences of any decimal numbers. Thus, depending on whether hard or soft decoding is being carried out, the sequences of symbols received are respectively estimated as numbers of the alphabet used on the transmission channel or as numbers which can take a greater diversity of values, such as, for example, information of a probabilistic nature with regard to the signal sent.

Each of the elements illustrated in FIG. 3 is well known to persons skilled in the art of information decoding systems and, more generally, information processing systems. These elements are therefore not described here.

The random access memory 204 stores data, variables and intermediate processing results, in memory registers bearing, in the remainder of the description, the same names as the data whose values they store. The random access memory 204 contains notably:

- a register "data" in which there is stored a decoded series of binary data which is intended to be placed at the output port 207,
- a register "phase_seq" in which there is stored the sequence of received symbols which corresponds to the in-phase components, and
- a register "quadra_seq" in which there is stored the sequence of received symbols which corresponds to the phase quadrature components.

The read only memory 205 stores data in memory registers bearing, in the remainder of the description, the same names as the data whose values they store. The read only memory 205 contains notably:

- the operating program for the central processing unit 206, in a register "program2",
- the orthogonal matrix $H_{10}$ in a register "matrix",
- a look-up table matching a row index of the orthogonal matrix $H_{10}$ with three decoded binary symbols, in a register "look-up tables".

The read only memory 205 constitutes a means of storing information which can be read by a computer or microprocessor. It stores instructions of a computer program which implements the decoding method which is the object of the invention.

According to a variant, the read only memory 205 is removable, partial or totally, and has for example a magnetic tape, a diskette or a fixed-memory compact disc ("CD-ROM").

Figure 4:
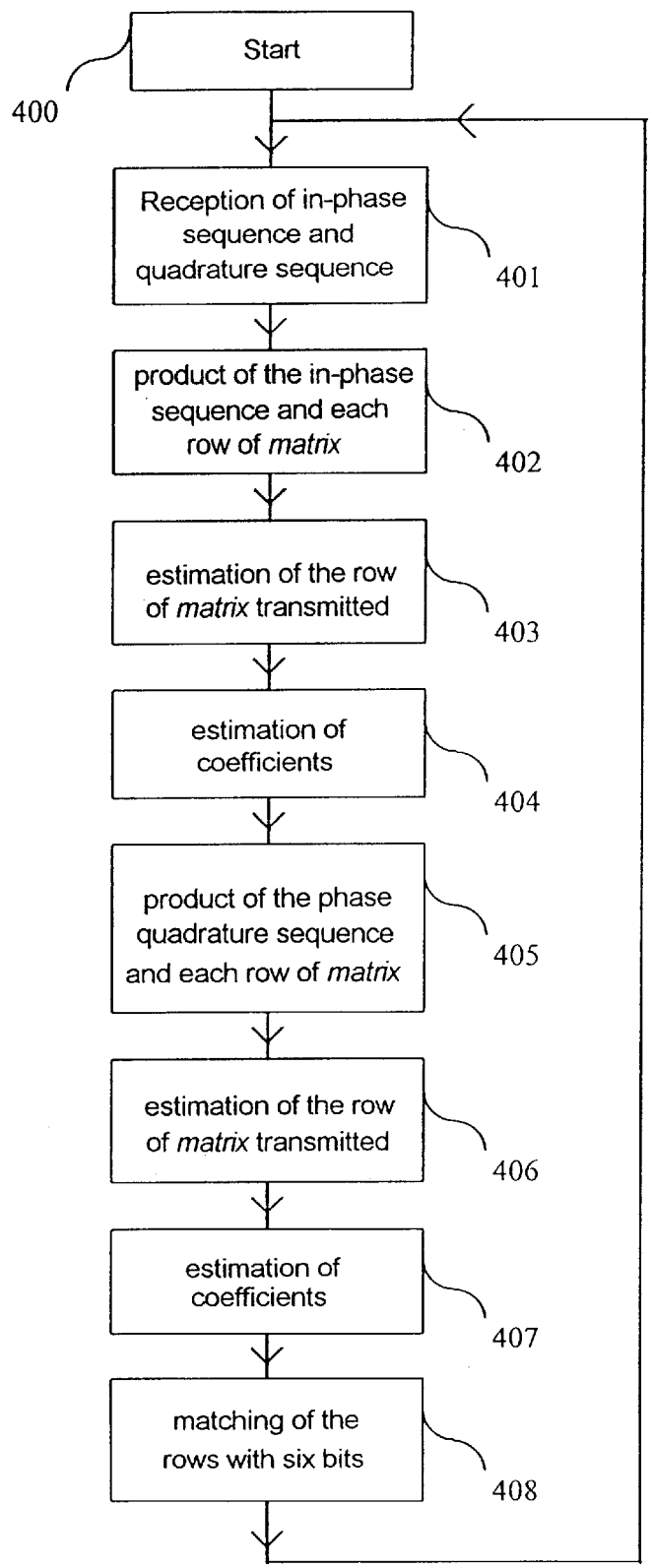
FIG. 4 depicts an operating flow diagram of the decoding device illustrated in FIG. 3.

The central processing unit 206 is adapted to implement the flow diagram described in FIG. 4. In FIG. 4 it can be seen that, during the operation 400, the receiving device illustrated in FIG. 3 is initialised.

Then, during an operation 401, a sequence of ten pairs of numerical values each corresponding successively to the two components (in-phase and phase quadrature) of a signal demodulated by the demodulator 210, is placed in the form of two sequences corresponding respectively to the ten successive in-phase components and the ten successive phase quadrature components, respectively in the registers "phase_seq" and "quadra_seq" of the random access memory 204.

Next, during an operation 402, the central unit 206 effects the scalar product of the row consisting of the sequence stored in the register "phase_seq" and each of the rows of the matrix $H_{10}$ conserved in the register "matrix". During an operation 403, the central unit 206 estimates the row of the sub-matrix used by the transmission device as being the one of the rows which, at the end of the operation 402, has the highest scalar product, in absolute value. The index of this row is then put in the register "data" of the random access memory 204.

During an operation 404, the central unit 206 estimates the multiplying coefficient applied to this row of the sub-matrix, equal to the sign of the scalar product whose absolute value is the highest. This coefficient, which equals "+1" or "−1", is then put in the register "data" of the random access memory 204.

The operations 405, 406 and 407 act respectively on the sequence corresponding to the phase quadrature components, in the same way as the operations 402, 403 and 404 act on the sequence corresponding to the in-phase components.

During an operation 408, the row look-up table detailed above, with regard to FIG. 2, is used to match each of the row indices determined during the operations 403 and 405 with three information bits. Likewise, the multiplying coefficients are each matched with a binary information item. The eight bits thus determined are on the one hand put in the register "data" of the random access memory 204 and on the other hand transmitted to the output port 207.

Then operation 401 is reiterated.

According to a variant, not shown, the sequence sent during operation 305 is a linear combination of rows of the matrix $H_{10}$, the indices of the rows which are the subjects of this linear combination, on the one hand, and the coefficients applied to these rows, on the other hand, conjointly representing information to be transmitted.

It will be understood that the decoding of the sequence received according to this variant is effected in a simple fashion, using the orthogonal nature of the rows of the matrix used.

For example, if the number of rows in the matrix $H_{10}$ which participate in each linear combination is three, and the coefficients applied are equal "+1" or "−1", by calculating the scalar product of the received sequence and each row of the matrix $H_{10}$, it is possible to estimate that:

- the three rows which were the subject of the linear combination are the three rows whose scalar products with the received sequence are the highest, in absolute value, and
- the coefficients applied to these rows are the signs of these three scalar products whose absolute values are the highest.

It should be noted however that the triplets of rows which are suitable for such a linear combination must be suited to the alphabet which it is expected to use on the transmission channel.

Thus, in order to limit the numbers constituting the sequences sent to the values of the alphabet (−6, −5, −4, −3, −2, 0, 2, 3, 4, 5, 6), there are 40 linear combinations of three rows of the matrix $H_{10}$ whose coefficients are equal to +1 or −1.

Likewise, in order to limit the numbers constituting the sequences sent to the values of the alphabet (−5, −4, −2, 0, 2, 4, 5), there are 20 linear combinations of three rows of the matrix $H_{10}$ whose coefficients are equal to +1 or −1.

What is claimed is:

1. A method of sending information, comprising:
   a sequence acquisition step of obtaining sequences of symbols, wherein
      the sequences are of a fixed length that is not a multiple of 4,
      the symbols are taken from an alphabet of non-nil integers, and
      the sequences are taken from a collection of sequences, at least three of which are orthogonal in pairs and such that any pair of sequences that are not orthogonal to each other comprises opposite sequences; and
   a transmission step of sending (305), on a transmission channel, the sequences of symbols.

2. A method according to claim 1, wherein the collection includes a number of sequences, which are orthogonal in pairs, which is equal to the length of the sequences.

3. A method according to claim 1, wherein differences between adjacent symbols of the alphabet are not all equal.

4. A method according to claim 3, wherein the alphabet includes two sub-alphabets such that, for each of the sub-alphabets, differences between adjacent symbols are equal.

5. A method according to claim 4, wherein the alphabet includes non-nil integers whose absolute value is less than a predetermined value.

6. A method according to claim 1, wherein a matrix formed by the orthogonal sequences is adapted to be broken down into circulant square sub-matrices.

7. A storage medium storing information that is adapted to be read by a computer or a microprocessor, said storage medium storing instructions of a computer program for implementing a method according to claim 1.

8. A storage medium storing information that is adapted to be read by a computer or a microprocessor, said storage medium storing data resulting from implementing a method according to claim 1.

9. A storage medium storing information that is adapted to be removed, partially or totally, and that is adapted to be read by a computer or a microprocessor, said storage medium storing instructions of a computer program for implementing a method according to claim 1.

10. A storage medium storing information that is adapted to be removed, partially or totally, and that is adapted to be read by a computer or a microprocessor storing data resulting from implementing a method according to claim 1.

11. A method of sending information, comprising:
a series acquisition step of obtaining a series of linear combinations of sequences of symbols that are of a fixed length that is not a multiple of 4, wherein
the symbols are taken from an alphabet of non-nil integers, and
the sequences are taken from a collection of sequences, at least three of which are orthogonal in pairs and such that any pair of sequences that are not orthogonal to each other comprises opposite sequences; and
a transmission step of sending (305), on a transmission channel, the series of symbols.

12. A method according to claim 11, wherein the series are restricted to series that have all their symbols belonging to a predetermined alphabet.

13. A method of receiving on a transmission channel, comprising:
a reception step of receiving (401), on the channel, sequences of a fixed length that is not a multiple of 4; and
an estimation step of estimating (403, 404, 406, 407) the sequences as sequences of symbols taken from an alphabet of non-nil integers, the sequences being taken from a collection of sequences, at least three of which are orthogonal in pairs and such that any pair of sequences that is not orthogonal to each other comprises opposite sequences.

14. A method according to claim 13, wherein, during said estimation step (403, 404, 406, 407), a calculation (403, 406) is effected of scalar products of a received sequence and each sequence of symbols of a maximum set of sequences that are orthogonal in pairs, in the collection of sequences.

15. A method according to claim 13, wherein the collection includes a number of sequences, which are orthogonal in pairs, which is equal to the length of the sequences.

16. A method according to claim 13, wherein differences between adjacent symbols of the alphabet are not all equal.

17. A method according to claim 16, wherein the alphabet includes two sub-alphabets such that, for each of the sub-alphabets, differences between adjacent symbols are equal.

18. A method according to claim 17, wherein the alphabet includes non-nil integers whose absolute value is less than a predetermined value.

19. A method according to claim 13, wherein a matrix formed by the orthogonal sequences is adapted to be broken down into circulant square sub-matrices.

20. A device for transmitting on a transmission channel, comprising:
a processing unit (104 to 106) adapted to associate, with information to be transmitted, sequences of symbols of a fixed length that is not a multiple of 4, the symbols taken from an alphabet of non-nil integers, wherein the sequences are taken from a collection of sequences, at least three of which are orthogonal in pairs and such that any pair of sequences that is not orthogonal to each other comprises opposite sequences, and
a transmission unit (107, 109, 110) adapted to transmit, on the channel, each of the sequences.

21. A device according to claim 20, wherein the collection includes a number of sequences, which are orthogonal in pairs, which is equal to the length of the sequences.

22. A device according to claim 20, wherein differences between adjacent symbols of the alphabet are not all equal.

23. A device according to claim 22, wherein the alphabet includes two sub-alphabets such that, for each of the sub-alphabets, differences between adjacent symbols are equal.

24. A device according to claim 23, wherein the alphabet includes non-nil integers whose absolute value is less than a predetermined value.

25. A device according to claim 20, wherein a matrix formed by the orthogonal sequences is adapted to be broken down into circulant square sub-matrices.

26. A device according to claim 20, wherein said processing unit (104 to 106) is adapted to determine a linear combination of the sequences.

27. A device for receiving on a transmission channel, comprising:
a reception unit (203, 209, 210) adapted to receive, on the channel, sequences of a fixed length that is not a multiple of 4; and
an estimation unit (204 to 206) adapted to estimate the sequences as sequences of symbols taken from an alphabet of non-nil integers, the sequences being taken from a collection of sequences, at least three of which are orthogonal in pairs and such that any pair of sequences that is not orthogonal to each other comprise opposite sequences.

28. A device according to claim 27, wherein said estimation unit (204 to 206) is adapted to calculate scalar products of a received sequence with each sequence of symbols of a maximum set of sequences that are orthogonal in pairs, in the collection of sequences.

29. A device according to claim 27, wherein the collection includes a number of sequences, which are orthogonal in pairs, which is equal to the length of the sequences.

30. A device according to claim 27, wherein differences between adjacent symbols of the alphabet are not all equal.

31. A device according to claim 30, wherein the alphabet includes two sub-alphabets such that, for each of the sub-alphabets, differences between adjacent symbols are equal.

32. A device according to claim 31, wherein the alphabet includes non-nil integers whose absolute value is less than a predetermined value.

33. A device according to claim 27, wherein a matrix formed by the orthogonal sequences is adapted to be broken down into circulant square sub-matrices.

34. A method of communicating on a transmission channel, said method comprising:
a transmission step of sending (305), on the channel, sequences of symbols of a fixed length that is not a multiple of 4, the symbols taken from an alphabet of non-nil integers, wherein the sequences are taken from a collection of sequences, at least three of which are orthogonal in pairs and such that any pair of sequences that is not orthogonal to each other comprises opposite sequences;

a reception step of receiving (401), on the channel, sequences of a fixed length that is not a multiple of 4; and an estimation step of estimating (403, 404, 406, 407) the received sequences as sequences of symbols taken from an alphabet of non-nil integers, the sequences being taken from a collection of sequences, at least three of which are orthogonal in pairs and such that any pair of sequences that is not orthogonal to each other comprises opposite sequences.

* * * * *

UNITED STATES PATENT AND TRADEMARK OFFICE
CERTIFICATE OF CORRECTION

PATENT NO. : 6,510,181 B1
DATED : January 21, 2003
INVENTOR(S) : Philippe Piret

It is certified that error appears in the above-identified patent and that said Letters Patent is hereby corrected as shown below:

Column 1,
Line 34, "function of" should read -- function of frequency. In addition --.

Column 3,
Line 55, "present." should read -- present --.

Column 5,
Line 18, "alphabet" should read -- alphabet of --.

Column 6,
Line 64, "nxn" should read -- nxn matrix --.

Signed and Sealed this

Sixteenth Day of September, 2003

JAMES E. ROGAN
*Director of the United States Patent and Trademark Office*